(12) United States Patent
Bazzani et al.

(10) Patent No.: US 11,361,212 B2
(45) Date of Patent: Jun. 14, 2022

(54) MACHINE LEARNING SYSTEM TO SCORE ALT-TEXT IN IMAGE DATA

(71) Applicant: Amazon Technologies, Inc., Seattle, WA (US)

(72) Inventors: Loris Bazzani, Berlin (DE); Maksim Lapin, Berlin (DE); Felix Hieber, Berlin (DE); Tobias Domhan, Berlin (DE)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 384 days.

(21) Appl. No.: 16/567,277

(22) Filed: Sep. 11, 2019

(65) Prior Publication Data

US 2021/0073617 A1    Mar. 11, 2021

(51) Int. Cl.

| | |
|---|---|
| *G06N 3/04* | (2006.01) |
| *G06N 20/00* | (2019.01) |
| *G06F 40/117* | (2020.01) |
| *G06F 17/16* | (2006.01) |
| *G06F 17/18* | (2006.01) |
| *G06K 9/62* | (2022.01) |
| *G06N 3/10* | (2006.01) |

(52) U.S. Cl.
CPC ........... *G06N 3/0454* (2013.01); *G06F 17/16* (2013.01); *G06F 17/18* (2013.01); *G06F 40/117* (2020.01); *G06K 9/6267* (2013.01); *G06N 3/105* (2013.01); *G06N 20/00* (2019.01)

(58) Field of Classification Search
CPC ...... G06N 3/0454; G06N 20/00; G06N 3/105; G06F 40/117; G06F 17/16; G06F 17/18; G06K 9/6267
See application file for complete search history.

(56) References Cited

U.S. PATENT DOCUMENTS

| | | | |
|---|---|---|---|
| 11,120,268 B2 * | 9/2021 | Gupta | G06K 9/6262 |
| 2017/0200065 A1 | 7/2017 | Wang et al. | |
| 2018/0121533 A1 * | 5/2018 | Magnani | G06F 16/248 |
| 2020/0066014 A1 * | 2/2020 | Mehta | G06F 16/5866 |
| 2020/0097604 A1 * | 3/2020 | Lee | G06K 9/4642 |

OTHER PUBLICATIONS

S. Qu, Y. Xi and S. Ding, "Visual attention based on long-short term memory model for image caption generation," 2017 29th Chinese Control and Decision Conference (CCDC), 2017, pp. 4789-4794, doi: 10.1109/CCDC.2017.7979342. (Year: 2017).*

(Continued)

*Primary Examiner* — Fayyaz Alam
(74) *Attorney, Agent, or Firm* — K&L Gates LLP

(57) ABSTRACT

Techniques are generally described for automatic scoring of alt-text for image data. In various examples, first image data and first text data describing the first image data may be received. A feature representation of the first image data may be determined using an encoder machine learning model. A hidden state representation may be determined using a decoder machine learning model based on the feature representation and a first word of the first text data. In some examples, a first score may be determined using the hidden state representation. The first score may include an indication of a descriptive capability of the first text data with respect to the first image data.

20 Claims, 7 Drawing Sheets

(56) References Cited

OTHER PUBLICATIONS

Shaomei et al.; Automatic Alt-text: Computer-generated Image Descriptions for Blind Users on a Social Network Service; CSCW 2017; Feb. 25-Mar. 1, 2017; 13 pgs; Portland, OR, USA.
Bazzani et al.; Image Captioning as Neural Machine Translation Task in SOCKEYE; Oct. 15, 2018; 10 pgs; Cornell University Library.
Author unknown; International Search Report and Written Opinion of PCT/US2020/047632; dated Nov. 26, 2020; 22 pgs.

* cited by examiner

MACHINE LEARNING SYSTEM TO SCORE ALT-TEXT IN IMAGE DATA

BACKGROUND

Alt-text (alternative text) is text inserted in hyper text markup language (HTML) to describe the appearance and/or function of an image on a web page. Alt-text is sometimes referred to as "alt tags" or "alt descriptions." Alt-text appears in place of an image in cases where the image fails to load. Additionally, alt-text is used by many computer-implemented screen-reading tools to describe images to visually-impaired persons (e.g., by generating audio data corresponding to the alt-text). Additionally, alt-text is used by search engines to find and rank webpages and/or image data embedded therein.

DETAILED DESCRIPTION

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Alt-text inserted into HTML can provide descriptions of the related image data that are useful for search engine algorithms, describing the image when the image data fails to load and/or render on a display, and for describing the image for the visually impaired. For example, visually impaired individuals may use software called screen readers that are programmed to convert digital text into synthesized speech that can be output as audio. Screen readers empower visually-impaired individuals to hear content and navigate websites on the internet, allowing such individuals to navigate and/or use information on the internet with the same levels of independence and privacy enjoyed by anyone else. In addition, screen readers may also be used by people with certain cognitive and/or learning disabilities, and/or by users that simply prefer audio content over text.

In order to describe image data embedded in a website, screen readers often read the alt-text that is embedded in the HTML in association with images. Accordingly, it may be beneficial to include alt-text that provides valuable information about the image so that visually-impaired individuals may navigate the webpage and/or understand its content more effectively. However, in many cases, the alt-text provided does not adequately describe the image. In some cases, the alt-text for an image merely includes default text which is not helpful for understanding the image.

Described herein, are various techniques for automated, machine learning systems that evaluate and score the quality of candidate alt-text provided for a given image. Furthermore, in at least some examples, the machine learning systems described herein are configured to score the quality of the alt-text in real time, as such text is typed (e.g., into a field for inserting alt-text into the HTML for a corresponding image). In an embodiment, the score is generated for the candidate alt-text based on a probability that the candidate alt-text describes the relevant image data. The machine learning systems described herein accept the relevant image and the current alt-text as input, and score the quality of the alt-text based on how well the alt-text describes the corresponding image.

Figure 1:
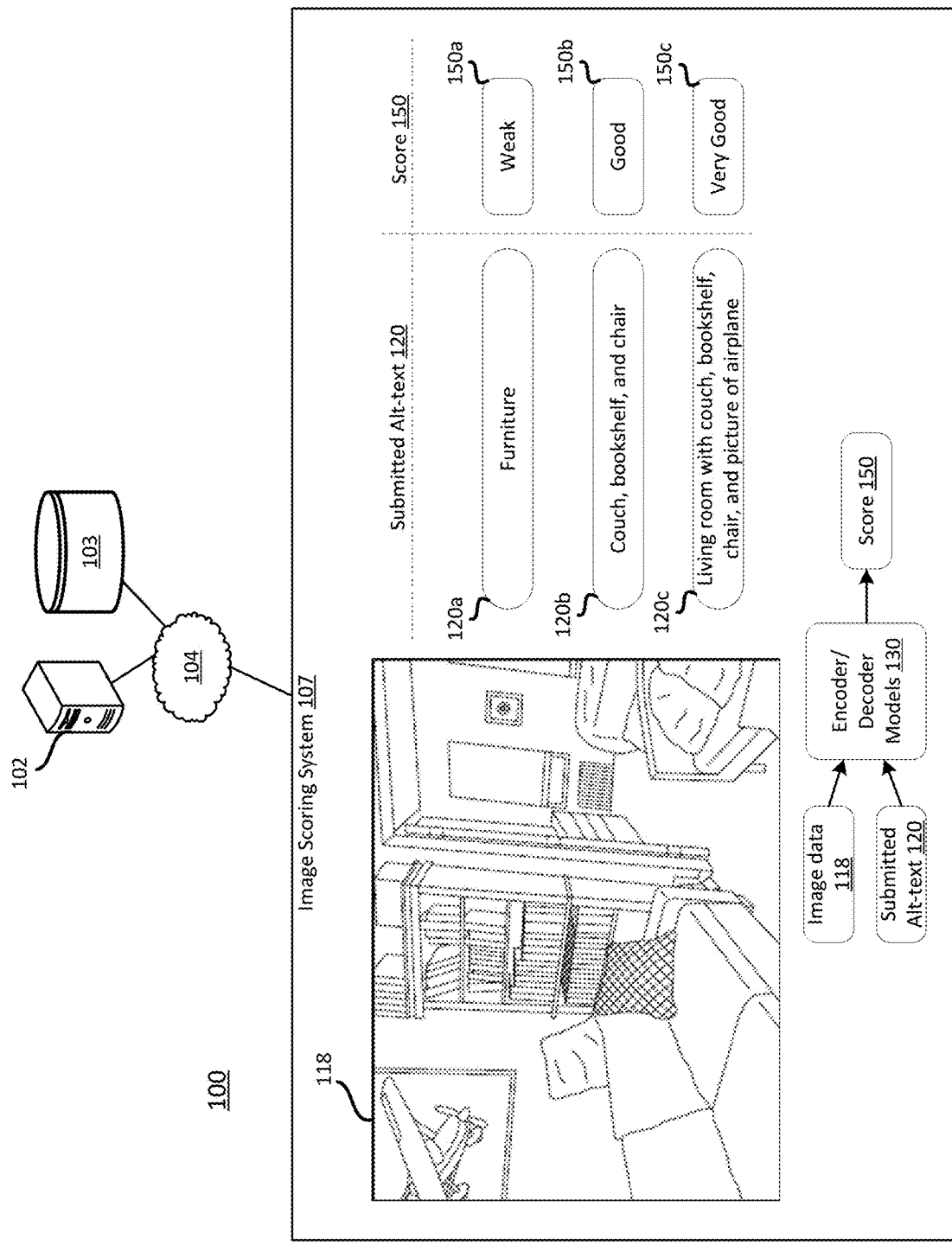
FIG. 1 is a block diagram depicting an example machine learning system effective to generate scores for alt-text in real time, in accordance with various aspects of the present disclosure.

FIG. 1 is a block diagram depicting an example machine learning system 100 effective to generate scores for alt-text in real time, in accordance with various aspects of the present disclosure.

In various embodiments, machine learning system 100 comprises computing device(s) 102. Computing device(s) 102 comprise one or more processors with each processor including one or more processor cores effective to execute computer-readable instructions used to perform the various techniques described herein. Computing device(s) 102 may include and/or may be configured in communication with memory 103. Although a single memory 103 is depicted in FIG. 1, in various examples, multiple memories may be used in accordance with the present disclosure. In various embodiments, memory 103 is a non-transitory computer-readable memory effective to store instructions that when executed by one or more processors of computing device(s) 102 are effective to program the one or more processors to perform the various techniques used to instantiate the machine learning models and score input alt-text, as described in further detail below.

In various embodiments, computing device(s) 102 and memory 103 are configured in communication over a network 104. Network 104 comprises a local area network (LAN) and/or a wide area network, such as the internet. Computing device(s) 102 and memory 103 communicate with one another and/or with one or more other computing devices over network 104. In some embodiments, computing device(s) 102 are effective to execute an image scoring system 107. In various examples, image scoring system 107 is a service effective to receive image data 118 and submitted alt-text 120 as inputs. Image scoring system 107 comprise one or more machine learning models, such as encoder/decoder models 130. As described in further detail below, image data 118 and submitted alt-text 120 may be input into encoder/decoder models 130. Encoder/decoder models 130 may generate a score 150 for a particular image and particular submitted alt-text (e.g., for an image/alt-text pair).

For example, as depicted in FIG. 1, image data 118 represents an image of an apartment. The image data 118 represents a sofa, a hanging picture of an airplane, a bookshelf holding many books, a doorframe leading to another room with a window and a bed, a chair, various throw pillows, etc. Image data 118 may be uploaded to image scoring system 107 for embedding in a website. Prior to uploading the full website, image scoring system 107 may prompt a user (e.g., an administrator of the website) to submit alt-text describing the image data 118. In various embodiments, image scoring system 107 provides a graphical user interface (GUI) effective to display the uploaded image data 118 and may provide a field that the user may use to input alt-text describing the image.

As the user types in the alt-text in the provided field, encoder/decoder models 130 generate score 150 based on the image data 118 and the submitted alt-text 120, in real time. For example, in one embodiment, the score 150 is updated as each character is typed (as each character modifies the string of the submitted alt-text 120). In another embodiment, the score 150 is updated as each word of the submitted alt-text 120 is typed. In the example depicted in FIG. 1, a user has submitted alt-text 120*a*, 120*b*, and 120*c* and encoder/decoder models 130 have generated corresponding scores 150*a*, 150*b*, and 150*c* (with score 150*a* corresponding to alt-text 120*a*, score 150*b* corresponding to alt-text 120*b*, and score 150*c* corresponding to alt-text 120*c*).

In the example shown in FIG. 1, alt-text 120*a* is the word "Furniture." Encoder/decoder models 130 may generate score 150*a* based on the input image data 118 and based on the alt-text 120*a*. In the example, score 150*a* indicates that the alt-text 120*a* is "weak," as describing the image data 118 as "furniture" may not provide a robust description of the image. Although, the submitted alt-text 120*a*, 120*b*, and 120*c* includes complete words and/or phrases, it should be appreciated that scores 150*a* may be generated in real time (e.g., on a character-by-character and/or word-by-word basis) as string data of submitted alt-text 120 is fed into encoder/decoder models 130 whenever the string data has changed (e.g., by adding, removing, and/or changing a character and/or a spacing of the characters). Additionally, although scores 150*a*, 150*b*, and 150*c* use string data to describe a strength of the submitted-alt-text 120, numerical scoring and/or graphical scoring (e.g., color coding and/or scoring meter graphics) may instead be used to indicate a strength of the alt-text, in various embodiments.

Continuing the example depicted in FIG. 1, submitted alt-text 120*b* is the phrase "Couch, bookshelf, and chair." Encoder/decoder models 130 may generate score 150*b* based on the input image data 118 and based on the alt-text 120*b*. In the example, score 150*b* indicates that the alt-text 120*b* is "Good," as describing the image data 118 as a "Couch, bookshelf, and chair" may provide an accurate and fairly complete description of the image.

Continuing the example depicted in FIG. 1, submitted alt-text 120*c* is the phrase "Living room with couch, bookshelf, chair, and picture of airplane." Encoder/decoder models 130 may generate score 150*c* based on the input image data 118 and based on the alt-text 120*c*. In the example, score 150*c* indicates that the alt-text 120*c* is "Very good," as describing the image data 118 as a "Living room with couch, bookshelf, chair, and picture of airplane" may provide accurate and descriptive detail pertaining to the image. Further, the score 150*c* of "Very good" may indicate a higher quality score relative to the score 150*b* of "Good," as encoder/decoder models 130 may have determined that the submitted alt-text 120*c* is of higher quality relative to the submitted alt-text 120*b*—at least for the particular image data 118. The particular words "good," "very good,"
"weak," etc., are implementation dependent. Different words and/or different representations of the score 150 may instead be used, in accordance with the desired implementation.

Scoring alt-text using a service as described above in a real-time context may encourage website administrators and/or those uploading image data to websites to provide useful and robust alt-text to describe the content of the uploaded images. In various examples, accessibility to visual content via natural language descriptions (such as alt-text) may allow visually-impaired people to interact with consumer devices, browse the internet, use social networks, and/or shop online.

Figure 2:
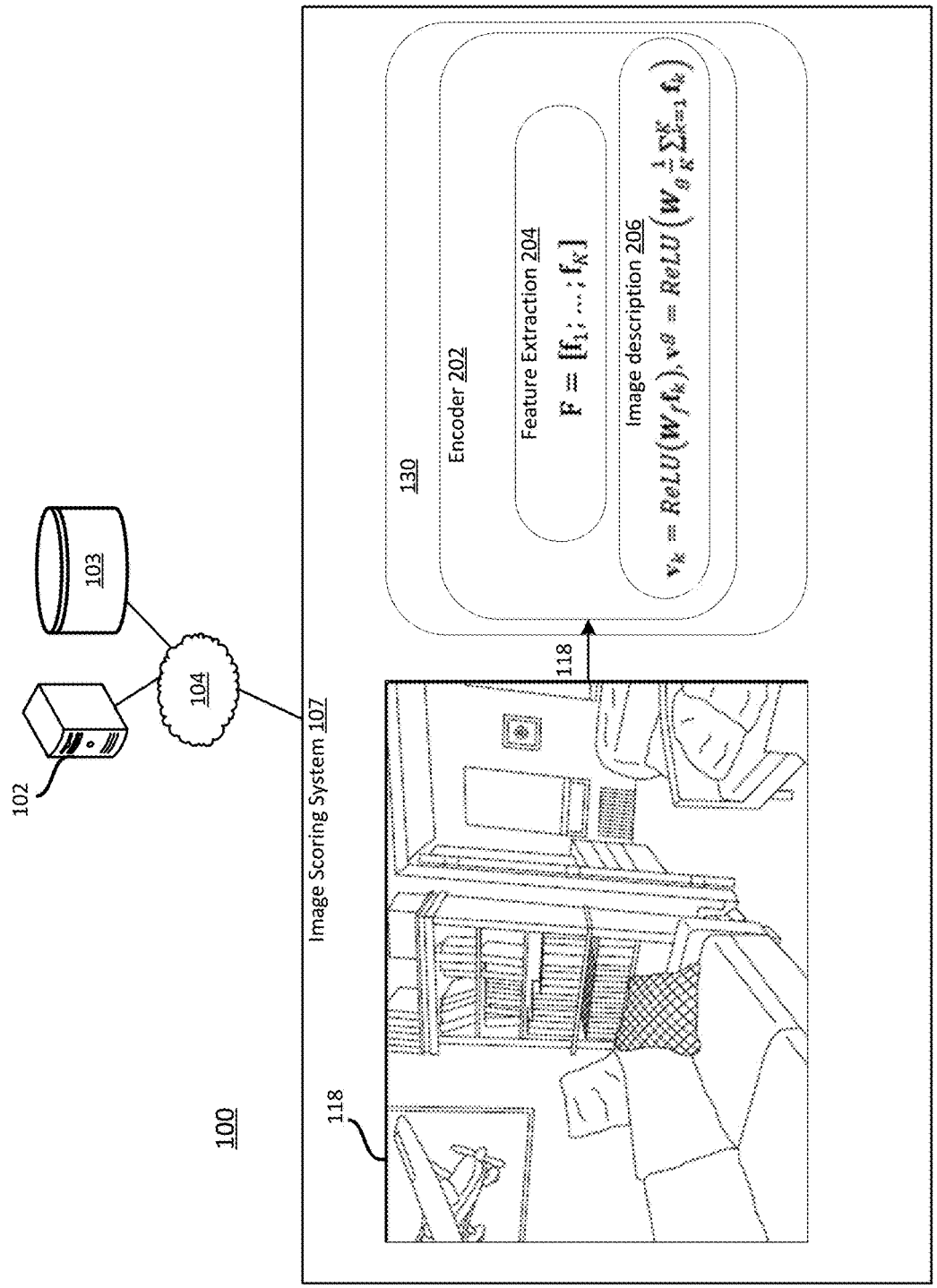
FIG. 2 is a block diagram describing an encoder of the encoder/decoder architectures described herein, in accordance with various aspects of the present disclosure.

FIG. 2 is a block diagram describing an encoder of the encoder/decoder models 130 that may be used to generate scores for alt-text in real time, in accordance with various aspects of the present disclosure.

Image captioning is a machine learning service that may be used to automatically generate text describing an image. Image captioning uses machine learning models that generate a semantic understanding of the visual content of an image that goes beyond mere image classification and object detection. For example, image captioning models not only recognize the objects represented in image data, but may also characterize interaction between the objects, generate adjectives describing the objects, and generate a phrase or sentence that makes grammatical sense to a human reader. In various examples, encoder-decoder deep neural network machine learning models may be used for image captioning. In at least some examples, encoder/decoder models 130 may include an encoder-decoder network, as described in further detail below.

In various examples, an encoder of an encoder/decoder pair may generate feature data semantically representing an image. The decoder may take the feature data as an input and may generate text data describing the image. For the encoder, deep convolutional networks trained for object recognition may be used as a feature extractor. In various examples, the decoder may be one or more Recurrent Neural Networks (RNNs) that takes as input the image features and the previous word, and generates a prediction for the next word. In practice, a single, fixed context for each word may be limiting, because different parts of the image are related to different words. Therefore, as described below, attentional decoder layers may be used to relate different parts of an image to respective words.

Alt-text can be input by a user and scored in real-time by the image scoring system 107. Image data is sent to an encoder 202. In one embodiment, the encoder 202 is pre-trained for object detection. In another embodiment, the encoder 202 is pre-trained for image classification. The encoder 202 extracts feature data that includes spatial information describing the location of objects detected and/or classified within the image data. For example, feature data extracted from the encoder 202 may describe the location of macroblocks of the image data that correspond to a visual representation of a dog (or other object). This feature data is sent to decoder 302 along with the user-submitted alt-text.

The temporal model of the decoder 302 generates a representation of the submitted alt-text that represents the sequence of words of the user-submitted alt-text (h_t). An attentional model of decoder 302 uses the feature data extracted by the encoder 202 and the representation of the sequence of words to make predictions on the next word of the user-submitted alt-text. Given the features detected in the image and the previously entered alt-text word(s) entered by the user, the encoder determines a probability distribution for a library of words that are likely to describe the image. As the user enters a new alt-text word, the computer system looks up the probability of the entered word and uses it to compute a score. The probability distribution is then recalculated taking into account the last submitted alt-text word. The probabilities for each word of the submitted alt-text are combined to generate a score indicating the quality of the alt-text with respect to the picture for which the alt-text was submitted. In some embodiments, the score is compared with one or more thresholds to how well the user-entered alt-text describes the image. For example scores below a threshold may be "poor" while scores above a threshold may be "good" or "excellent". In another embodiment, the score may be represented as a color code e.g. red=poor and green=good or the number of the score can be caused to be displayed on a user interface of the user's input device.

The goal of image captioning is to model the probability distribution $p(Y|X; \theta)$, where X is a source image (e.g., image data 118), $Y=(y_1, \ldots, y_m)$ is a target description of the source image, and $\theta$ is a parametrization of the selected machine learning models (e.g., $\theta$ represents weights of the selected machine learning models). A candidate alt-text word submitted by a user is assigned the probability from the target probability distribution during scoring. Each $y_t$ may be an integer ID given by target vocabulary mapping, $V_{trg}$, built from the training data tokens and represented as one-hot vectors $y_t \in \{0,1\}^{|V_{trg}|}$. The one hot vectors $y_t$ may be embedded into e-dimensional vector representations, $E_T y_t$, using a learned embedding matrix $E_T \in \mathbb{R}^{e \times |V_{trg}|}$. The learned embedding matrix $E_T$ may be effective to project the original data $y_t$ into a lower dimension.

The probability can be factorized as follows:

$$p(Y|I;\theta)=\Pi_{t=1}^{m}p(y_t|Y_{1:t-1},X;\theta) \quad (1)$$

During training, parameters are learned that maximize the log likelihood:

$$\theta^* = \arg\max_{\theta} \sum_{t=1}^{m} \log(p(y_t \mid Y_{1:t-1}, X; \theta)) \quad (2)$$

$(p(y_t|Y_{1:t-1},X;\theta))$ is parameterized via a softmax output layer (or an output layer using a different activation function) over a decoder representation $\bar{h}_t$:

$$(p(y_t|Y_{1:t-1},X;\theta))=\text{softmax}(W_o \bar{h}_t + b_o) \quad (3)$$

where $W_o$ scales to the dimension of the target vocabulary $V_{trg}$. Even though it is not explicit in the equation, the decoder representation $\bar{h}_t$ depends on the image X, as described in further detail below. Given the high dimensionality of the image, images may be encoded into a lower dimensional representation. In the next sections, image encoding and caption generation are described. The maximization problem of Eq. 2 may be solved by optimizing the cross-entropy loss given Eq. 3.

Image Encoder

The image encoder 202 of encoder/decoder models 130 projects the image (e.g., image data 118) into a feature space that has lower dimensionality relative to an input, full-resolution image. In various examples, one or more convolutional neural networks (CNNs) that are pre-trained for image recognition may be used for encoder 202. Since CNNs are trained to recognize objects in images, it is likely that such CNNs are activated in correspondence to object words (e.g., words describing objects appearing in the image) in the context of captioning. Although, in FIG. 2, the encoder 202 is depicted as including feature extraction 204 and image description 206, such components may be part of a single machine learning model (e.g., encoder 202). Encoder 202 may be implemented using a pre-trained object detector and/or a network trained for classification at the image level (e.g., to classify one object shown in an image). In general, encoder 202 may be used to extract features from image data that include spatial information describing the location of one or more objects within the image data.

In an example implementation, a ResNet–152 model, pre-trained on the ImageNet dataset may be used for encoder 202. Image data 118 may be received at an input layer of the CNN encoder 202. In various examples, the last convolutional layer may be used for feature extraction. The last convolutional layer may be the last layer of the CNN that retains the spatial information of the image data prior to the fully-connected layers. As described in further detail below, the decoder(s) of encoder/decoder models 130 may use the spatial information output by encoder 202 to correlate words to different parts of the image via attention. In various examples, the CNN may be trained separately from the decoder models described in further detail below. For example, parameters of encoder 202 may be precomputed using different training data relative to training data used to train models of the decoder.

In various other examples, features from object detection CNNs may be used (e.g., ResNet–101). In such examples, each detected object may be represented by a mean-pooled convolutional feature from the object's region of the image data 118.

The resulting feature map from feature extraction 204 may be a matrix $F=[f_1; \ldots; f_K]$, where K corresponds to the spatial locations in the feature map (and/or object detections). Each vector $f_K$ may be a d-dimensional feature (e.g., 2048 dimensions). Moreover, in various examples, a global image description $f^g$ may be generated by average pooling descriptors over the dimension k. Since the feature dimensionality d of the convolutional layer is often high, the ResNet features may be projected to a lower dimension $d' \ll d$ using a fully-connected layer:

$$v_k = ReLU(W_f f_k),\ v^g = ReLU\left(W_g \frac{1}{K}\sum_{k=1}^{K} f_k\right) \quad (4)$$

composing the matrix $V=[v_1; \ldots; v_K; v^g]$ at image description action 206. The matrix V also includes the global image descriptor, $v^g$.

Figure 3:
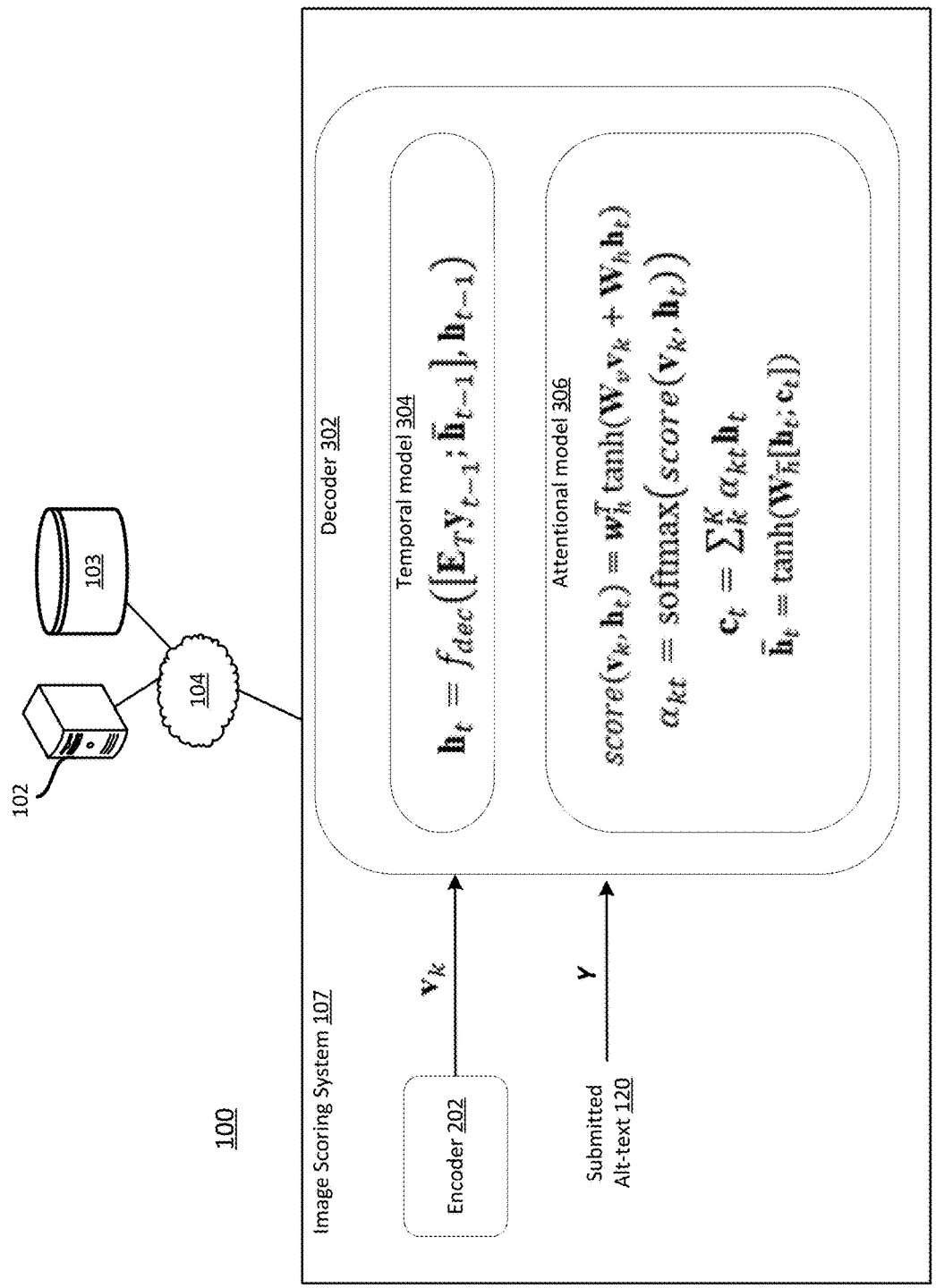
FIG. 3 is a block diagram describing decoders of the encoder/decoder architectures described herein, in accordance with various aspects of the present disclosure.

FIG. 3 is a block diagram describing decoders of the encoder/decoder architectures described herein, in accordance with various aspects of the present disclosure. Although RNNs are discussed below with respect to decoder 302, any language model (e.g., a convolutional network for language) may be used.

Caption Decoders Decoder 302 includes two models: 1) a temporal model 304 (e.g., a temporal recurrent neural network) that encodes the temporal information of the sequence of words (e.g., of submitted alt-text 120), and 2) an attentional model 306 that filters and selects the information received from encoder 202 which is used as context to make predictions on the next word of the sequence.

In various examples, temporal model 304 may be a recurrent neural network (RNN) defined as:

$$h_t = f_{dec}([E_T y_{t-1}; \bar{h}_{t-1}], h_{t-1}), \quad (5)$$

where $f_{dec}$ is a (multi-layer) RNN (or other language model), $h_t$ is the current hidden state of the RNN, $h_{t-1}$ is the previous hidden state of the RNN, and $\bar{h}_{t-1}$ is the image-dependent attentional vector.

An attentional score $\alpha_{kt}$ is computed by considering the input image representation (e.g., the output of encoder 202, projection $v_k$) as well as the current word hidden representation $h_t$, as follows:

$$\text{score}(v_k, h_t) = w_h^T \tanh(W_v v_k + W_h h_t) \quad (6)$$

$$\alpha_{kt} = \text{softmax}(\text{score}(v_k, h_t)) \quad (7)$$

The attentional score $\alpha_{kt}$ is a weight that emphasizes portions of the image data 118 (e.g., at the pixel level, macroblock level, and/or at some other address(es) within the image data) that corresponds to the current word hidden representation $h_t$ while de-emphasizing other portions of the image data 118. Although the softmax function is depicted in equation (7) other activation functions may be used in various embodiments, depending on the desired implementation. The context vector $c_t$ is the sum of hidden vectors $h_t$ weighted by the attentional score $\alpha_{kt}$: $c_t = \Sigma_k^K \alpha_{kt} h_t$. This kind of attention is often called Multi-Layer Perceptron (MLP) attention, as the score is computed with MLP-style model. In various other examples, the dot product between $v_k$ and $h_t$ may be used to compute attention.

The context vector $c_t$ and the output of the temporal model 304 $h_t$ may be combined as shown in equation (8) (e.g., concatenated) to determine the image-dependent attentional vector $\bar{h}_t$ as:

$$\bar{h}_t = \tanh(W_{\bar{h}}[h_t; c_t]) \quad (8)$$

The image-dependent attentional vector $\bar{h}_t$ may be used to predict the probability of the next word $y_t$ as described above in equation (3). In various examples, $\bar{h}_t$ may be referred to as an attentional hidden state representation.

In an alternative embodiment, in equation (5), the global image descriptor $v^g$ may be concatenated with the input of the RNN: $[E_T y_{t-1}; \bar{h}_{t-1}; v^g]$.

Figure 4:
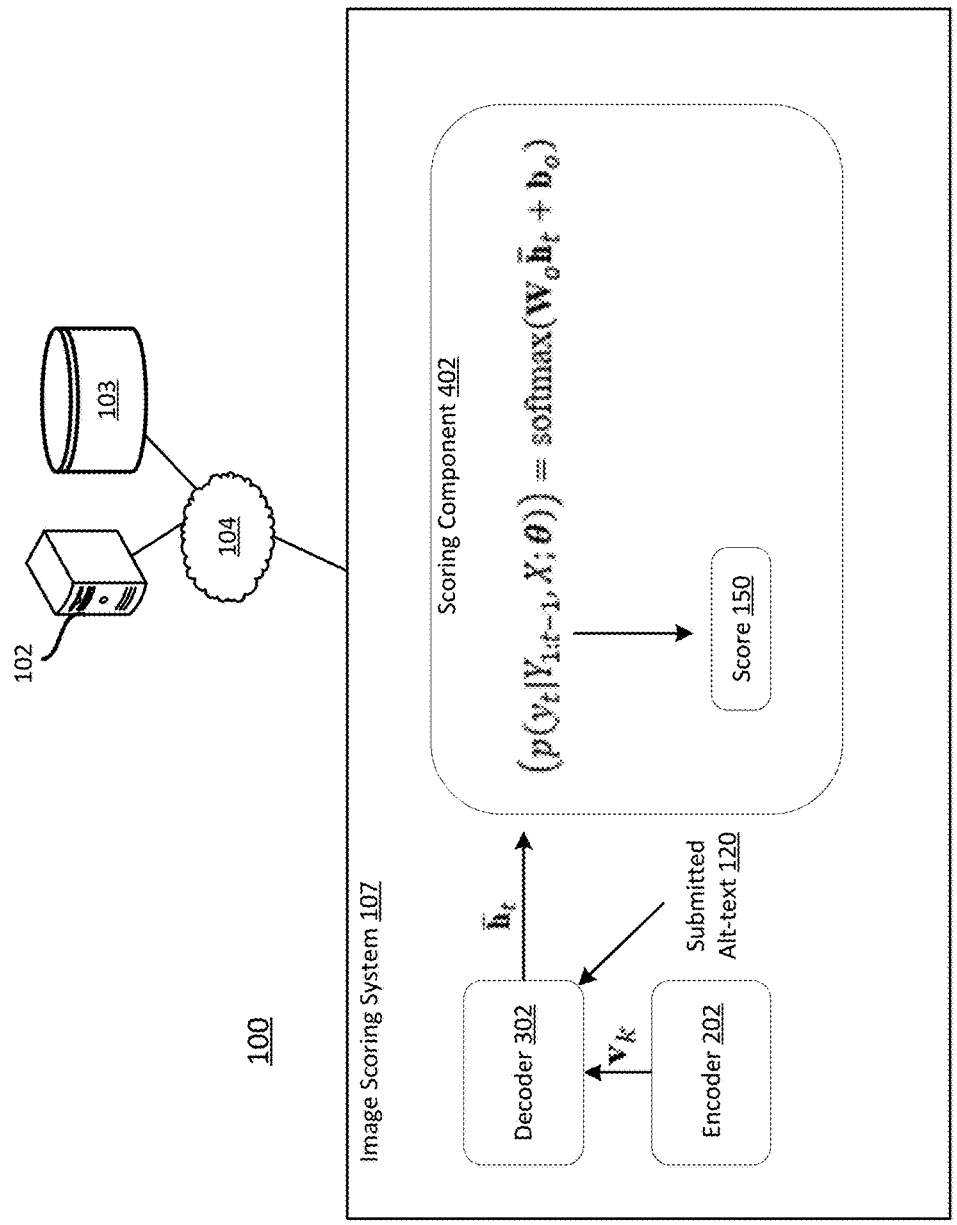
FIG. 4 is a block diagram depicting a scoring component effective to generate a score for input alt-text, in accordance with various aspects of the present disclosure.

FIG. 4 is a block diagram depicting a scoring component 402 effective to generate a score for input alt-text, in accordance with various aspects of the present disclosure. Encoder 202 receives image data 118 as input and generates the feature representation $v_k$ (along with global image descriptor $v^g$, depending on the desired implementation). Decoder 302 receives the feature representation $v_k$ and the submitted alt-text 120 as input. Decoder 302 outputs the image-dependent attentional vector $\bar{h}_t$ that is used to predict the probability of the next word $y_t$ of submitted alt-text 120. Scoring component 402 generates the probability that the current image/alt-text pairing is generated by the encoder/decoder models 130 (using equation (3)). In various examples, the negative logarithm of the probability may be determined to generate a normalized score. If the negative logarithm score is used the lower score represents stronger alt-text. Conversely, if the simple probability is used (e.g., the output from equation (3)) as the output score, higher probabilities represent stronger alt-text.

In various examples, the combined score ("log_prob") for the alt-text Y may be generated using equation (9):

$$\log_{prob} = \Sigma(\log(p(y_t | Y_{1:t-1}, X; \theta))) \quad (9)$$

In various examples, log_prob may be normalized by length and brevity of the submitted alt-text. For example, a length penalty may be introduced to penalize the score for alt-text that is too long. Similarly, a brevity penalty may be introduced to penalize the score for alt-text that is too short. For example:

length_penalty=(beta+ref_len)^alpha/(beta+1)^alpha score=log_prob/length_penalty where alpha, beta may be parameters selected according to the desired implementation. ref_len is the length of the reference sentence (e.g., a sentence generated by the model) in terms of number of words.

As previously described above with respect to FIG. 1, the scores 150 may be displayed and/or graphical indicator data may be displayed describing the relative strength of the currently-submitted alt-text 120. For example, descriptors such as "very weak," "weak," "good," "very good," can be used. Additionally, in various other examples, numerical scores and/or graphical indicators may be used to indicate the strength of the alt-text. In general, an indication of the score may be displayed and/or otherwise output for submitted alt-text 120. An indication of the score may be graphical indicator data, numerical scores, audio, etc.

Generally, in machine learning models, after initialization, annotated training data may be used to generate a cost or "loss" function that describes the difference between expected output of the machine learning model and actual output. The parameters (e.g., weights (W) and/or biases (b)) of the machine learning model may be updated to minimize (or maximize) the cost. For example, the machine learning model may use a gradient descent algorithm to incrementally adjust the weights to cause the most rapid decrease (or increase) to the output of the loss function.

In various examples, the encoder 202 may be an image feature extractor that is pre-trained and which is not updated during training of the decoder 302. Advantageously, features may be pre-extracted from image data using the pre-trained encoder 202 and stored. The speed of training and/or prediction (e.g., scoring of alt-text) may be improved using such pre-extracted features.

Figure 5:
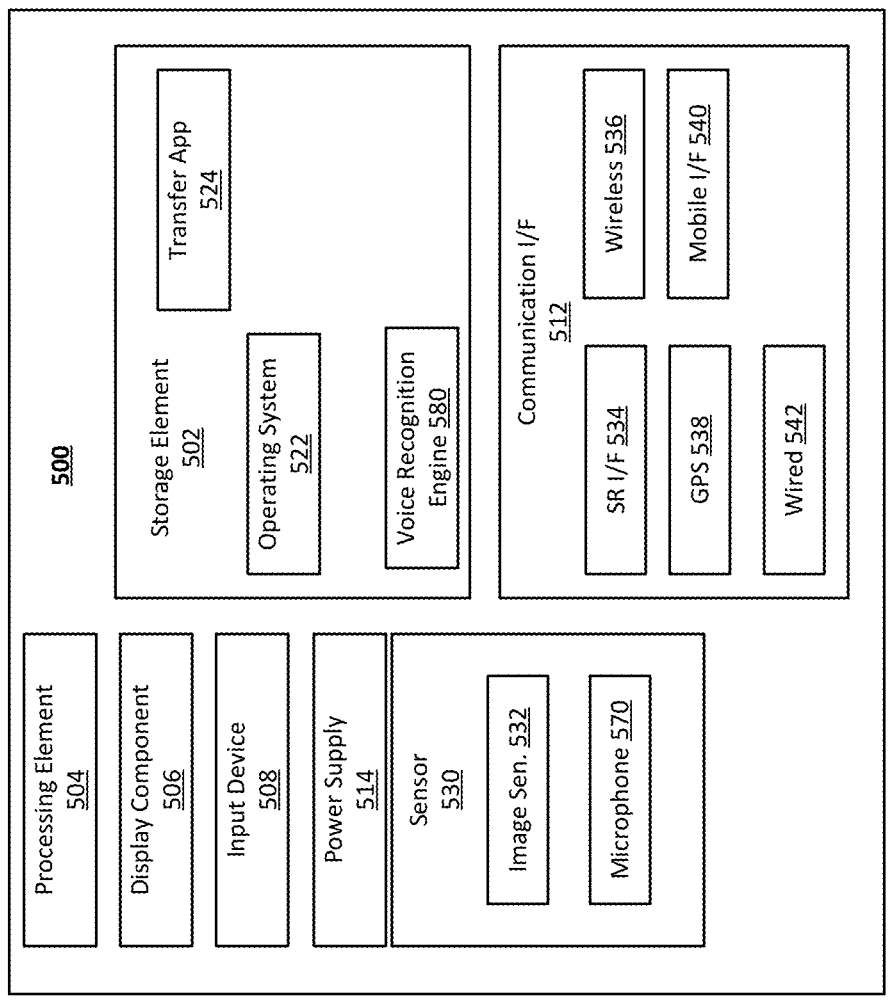
FIG. 5 depicts an example architecture of a computing device that may be used in accordance with various aspects of the present disclosure.

FIG. 5 is a block diagram showing an example architecture 500 of a computing device, such as the processors and other computing devices described herein. It will be appreciated that not all user devices will include all of the components of the architecture 500 and some user devices may include additional components not shown in the architecture 500. The architecture 500 may include one or more processing elements 504 for executing instructions and retrieving data stored in a non-transitory computer-readable storage element 502. The processing element 504 may comprise at least one processor. Any suitable processor or processors may be used. For example, the processing element 504 may comprise one or more digital signal processors (DSPs) and/or image signal processors (ISPs). The storage element 502 can include one or more different types of non-transitory, computer-readable memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc.

The storage element 502 may also store software for execution by the processing element 504. An operating system 522 may provide the user with an interface for operating the user device and may facilitate communications and commands between applications executing on the architecture 500 and various hardware thereof. A transfer application 524 may be configured to receive data from another device or from an integrated device (e.g., image sensor 532) included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 for capturing sounds, such as voice commands. Voice recognition engine 580 may interpret audio signals of sound captured by microphone 570. In some examples, voice recognition engine 580 may listen for a "wake word" to be received by microphone 570. Upon receipt of the wake word, voice recognition engine 580 may stream audio to a voice recognition server for analysis. In various examples, voice recognition engine 580 may stream audio to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other user devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol. In various examples where architecture 500 represents computing device(s) 102 (shown in FIG. 1), mobile interface 540 may allow computing device(s) 102 to communicate with one or more other computing devices.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output.

In some examples, the GPS interface 538 may be utilized as a motion sensor. For example, changes in the position of the architecture 500, as determined by the GPS interface 538, may indicate the motion of the GPS interface 538.

Figure 6:
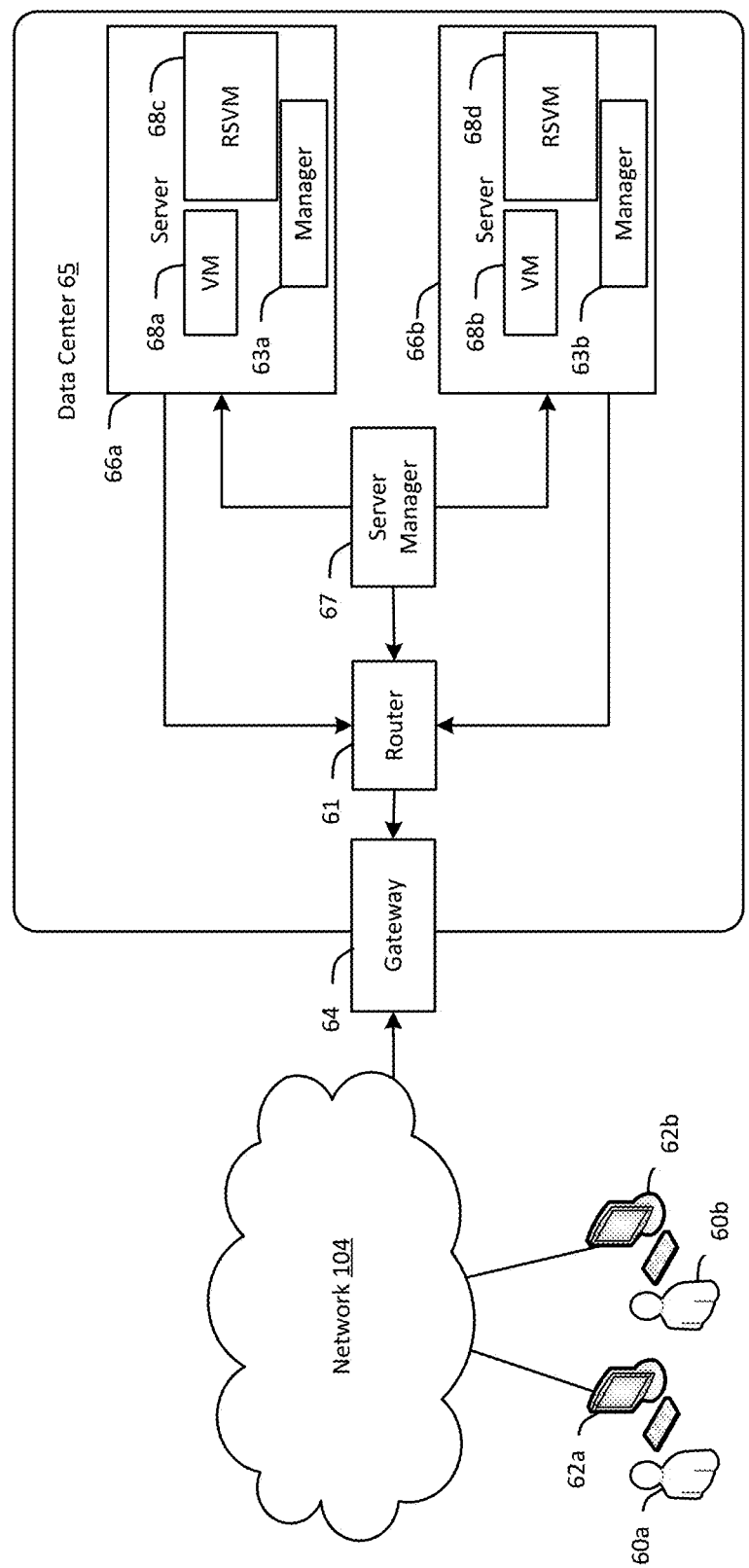
FIG. 6 is a diagram illustrating an example system for sending and providing data that may be used in accordance with the present disclosure.

An example system for sending and providing data and performing various computer-implemented processes will now be described in detail. In particular, FIG. 6 illustrates an example computing environment in which the embodiments described herein may be implemented. For example, the computing environment of FIG. 6 may be used to provide scoring of alt-text as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more techniques of the computing device(s) 102, as described herein.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and enabling computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
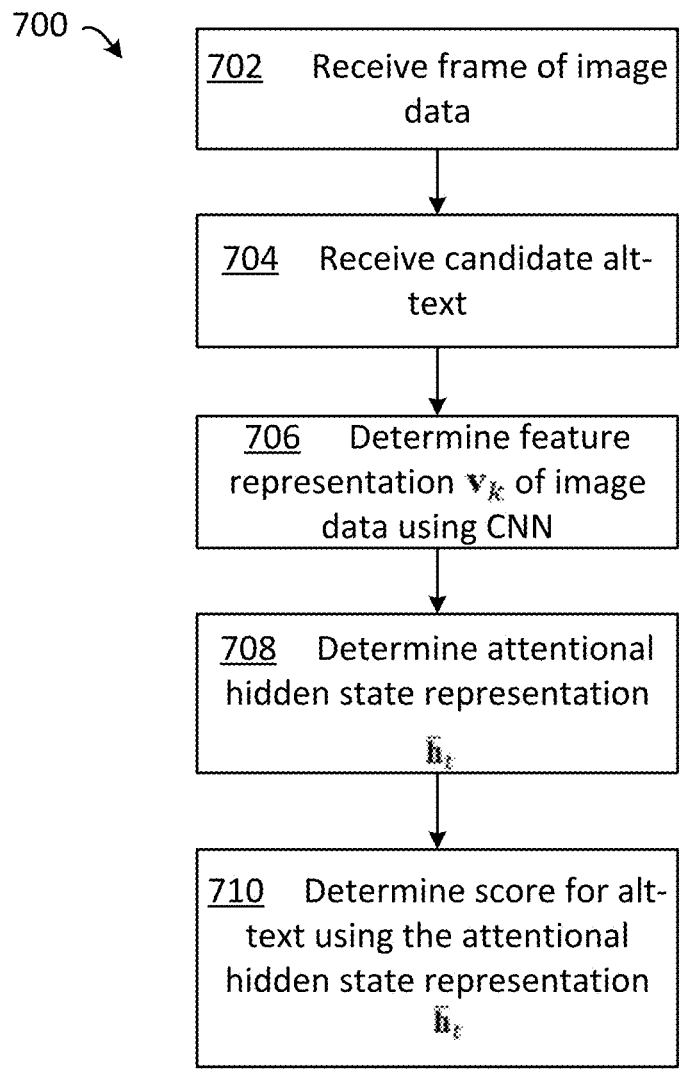
FIG. 7 is a flow chart illustrating an example process for determining a score for candidate alt-text, in accordance with various aspects of the present disclosure.

FIG. 7 is a flow chart illustrating an example process 700 for determining a score for candidate alt-text, in accordance with various aspects of the present disclosure.

The process 700 of FIG. 7 may be executed by computing device(s) 102 and/or by a combination of computing device(s) 102 and one or more other computing devices. The actions of process 700 represent a series of instructions comprising computer-readable machine code executable by a processing unit of a computing device. In various examples, the computer-readable machine code is comprised of instructions selected from a native instruction set of the computing device and/or an operating system of the computing device. Various actions in process 700 are described above with reference to elements of FIGS. 1-6.

Processing begins at action 702, "Receive frame of image data." At action 702, a frame of image data is received and may be displayed on a graphical user interface (GUI). For example, the image data 118 of FIG. 1 is displayed on a GUI that prompts a user to submit alt-text describing the image for insertion of the alt-text in HTML associated with the image.

Processing may continue from action 702 to action 704, "Receive candidate alt-text." At action 704, candidate alt-text, such as submitted alt-text 120a, 120b, 120c of FIG. 1 is received. In various examples, the alt-text is input via a field of a GUI that requests that a user enter alt-text describing the image received at action 702.

Processing may continue from action 704 to action 706, "Determine feature representation $v_k$ of image data using CNN." At action 706, a feature representation of the image is determined using an encoder of encoder/decoder models 130. In various examples, the encoder includes a convolutional neural network pre-trained using a set of labeled image data (e.g., image data with labels identifying objects represented the image as well as positions of the objects). As previously described, in various examples the features are extracted from the image data at the last convolutional layer of the CNN in order to preserve spatial data describing positions of various objects within the image data. The feature extracted may be a matrix $F=[f_1; \ldots ; f_K]$. The features are projected to a lower dimension using a fully-connected layer of the encoder using equation (4), above.

Processing may continue from action 706 to action 708, "Determine attentional hidden state representation $\bar{h}_t$." At action 708, decoders of encoder/decoder models 130 are used to determine an attentional hidden state representation $\bar{h}_t$. In various examples, the decoders comprise a temporal RNN model that determine a hidden state representation $h_t$ of a current word of the candidate alt-text based on previous words of the sentence/phrase according to equation (5), above. In various further examples, the decoder may include an attentional model effective to generate an attentional score that weights portions of image data that correspond to a particular object identified in the image data as pertaining to a word of the candidate alt-text. For example, if a current word is "dog," the attentional score $\alpha_{kt}$ may provide a relatively large weight to those pixels and/or macroblocks of the image data that have been determined by the CNN to correspond to some portion of a dog, while non-dog portions may receive a relatively low (or zero) weight. The attentional score $\alpha_{kt}$ and the hidden state representation $h_t$ generated by the temporal RNN model is used to generate the attentional hidden state representation $\bar{h}_t$.

Processing may continue from action 708 to action 710, "Determine score for alt-text using the attentional hidden state representation $\bar{h}_t$." At action 710, score 150 for the candidate alt-text is generated using the attentional hidden state representation $\bar{h}_t$. For example, equation (3) is used to determine a per-word probability for the candidate alt-text. The per-word probability may be combined to determine score 150. In some further examples, the score may be normalized by taking the negative logarithm of the probabilities. The score may be generated in real time as alt-text is typed into a field of the GUI. Additionally, additional word and/or words may be suggested to the user based on the target description Y (e.g., suggested text), described above. For example, a first score may be generated as a first word is typed, a second score may be generated for a second score, etc. Additionally, scores may be computed for every character of a text string that is submitted as alt-text. Accordingly, the scores 150 may be incrementally updated as additional characters added and/or as characters are removed. The score 150 may be displayed in association with the candidate alt-text for which the score 150 has been generated.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of generating a score for alternative text (alt-text) in HTML, comprising:
   receiving first image data representing a first image;
   receiving first text data describing the first image;
   sending the first image data to an input layer of a convolutional neural network (CNN) trained to recognize objects;
   determining first feature data from a last convolutional layer of the CNN, the first feature data representing the first image data;
   sending the first feature data and the first text data to a decoder model comprising a temporal recurrent neural network (RNN) and an attentional model;
   generating, by the temporal RNN using a previous word of the first text data, a hidden state representation $h_t$ of a current word $y_t$ of the first text data;
   generating, by the attentional model, an image-dependent attentional vector $\bar{h}_t$ using the hidden state representation $h_t$ and the first feature data;
   determining a probability of the current word $y_t$ by inputting the image-dependent attentional vector $\bar{h}_t$ into a softmax output layer of the attentional model; and
   displaying the score for the first text data, wherein the score is an indication of a descriptive capability of the first text data with respect to the first image.

2. The method of claim 1, further comprising:
   detecting, by the CNN, a first object represented in the first image data; and
   determining, by the CNN, a matrix $F=[f_1; \ldots ; f_K]$, wherein $f_1$ corresponds to a feature representation of at least a portion of the first object and wherein K corresponds to a spatial location of a given feature representation of the matrix F.

3. The method of claim 2, further comprising
   determining a projection $v_k$ of the matrix F in a lower dimension; and
   determining a global image description $f^g$, wherein the first feature data comprises the projection $v_k$ and the global image description $f^g$.

4. A method of scoring user-entered alt-text describing an image with a computing device, the method comprising:
   receiving, by the computing device, image data for an image;
   analyzing the image data with a first machine learning model to identify features in the image;
   receiving, from a user input device user-entered alt-text data describing the features in the image;
   determining, by the computing device, a score for the user-entered alt-text data indicating how well the user-entered alt-text data describes the features in the image; and
   causing a display of the score to appear on the user input device in association with the user-entered alt-text data.

5. The method of claim 4, further comprising receiving the user-entered alt-text data in a field of graphical user interface (GUI) of the user input device, wherein the GUI displays the first image data.

6. The method of claim 5, further comprising using a second machine learning model that receives as inputs the features detected in the image and previously entered alt-text data to determine a probability for a number of words that describe the features in the image and using the second machine learning model to determine the score for the user-entered alt-text data, wherein the probability is recomputed after each alt-text word is entered by the user.

7. The method of claim 6, further comprising:
   causing the display of the score as one or more of a textual description, color code or numeric indication of how well the user-entered alt-text describes the features of the image on the user input device.

8. The method of claim 7, further comprising:
   using a temporal decoder model to analyze the user-entered alt-text data, wherein the temporal decoder model includes a hidden representation $h_t$ of a first word of user-entered alt-text data based at least in part on a second word of the user-entered alt-text data, wherein the first word follows the second word.

9. The method of claim 8, further comprising:
   determining, by an attentional decoder model, an attentional score comprising a weight emphasizing at least one portion of the image data that corresponds to the hidden representation $h_t$.

10. The method of claim 9, further comprising determining probability based at least in part on the attentional score.

11. The method of claim 4, further comprising:
    detecting, by a convolutional neural network (CNN), the features in image data; and
    determining, by the CNN, a matrix $F=[f_1; \ldots ; f_K]$, wherein $f_1$ corresponds to a representation of at least a first feature at a first spatial location in the image data.

12. The method of claim 4, further comprising causing a display of the image with the user-entered alt-text data.

13. A system for scoring text describing an image, the system comprising:
    at least one processor; and
    at least one non-transitory computer-readable memory storing instructions that, when executed by the at least one processor, are effective to program the at least one processor to:
    receive first image data;
    receive first text data comprising candidate alt-text describing the first image data;
    determine a first score for the first text data based on a probability that the first text data describes the first image data; and
    display an indication of the first score in association with the first text data.

14. The system of claim 13, the at least one non-transitory computer-readable memory storing further instructions that, when executed by the at least one processor, are further effective to program the at least one processor to:
- receive the first text data in a field of graphical user interface (GUI), wherein the GUI displays the first image data; and
- display the first score in association with the first text data and the first image data.

15. The system of claim 14, the at least one non-transitory computer-readable memory storing further instructions that, when executed by the at least one processor, are further effective to program the at least one processor to generate a respective second score for the first text data as each word of the first text data is entered into the field of the GUI.

16. The system of claim 13, the at least one non-transitory computer-readable memory storing further instructions that, when executed by the at least one processor, are further effective to program the at least one processor to:
- generate, by a decoder machine learning model, second text data based at least in part on the first text data and the first image data; and
- display the first text data and the second text data in a field of a graphical user interface, wherein the second text data comprises suggested text that is descriptive of the first image data.

17. The system of claim 13, the at least one non-transitory computer-readable memory storing further instructions that, when executed by the at least one processor, are further effective to program the at least one processor to:
- determine, by a temporal decoder model, a hidden representation $h_t$ of a first word of the first text data based at least in part on a second word of the first text data, wherein the first word follows the second word in the first text data.

18. The system of claim 17, the at least one non-transitory computer-readable memory storing further instructions that, when executed by the at least one processor, are further effective to program the at least one processor to:
- determine, by an attentional decoder model, an attentional score comprising a weight emphasizing at least one portion of the first image data that corresponds to the hidden representation $h_t$.

19. The system of claim 18, the at least one non-transitory computer-readable memory storing further instructions that, when executed by the at least one processor, are further effective to program the at least one processor to determine first representation data further based at least in part on the attentional score.

20. The system of claim 13, the at least one non-transitory computer-readable memory storing further instructions that, when executed by the at least one processor, are further effective to program the at least one processor to:
- determine first representation data representing the first image data using a first machine learning model; and
- determine second representation data using a second machine learning model, wherein the second representation data is determined based at least in part on the first representation data and a first word of the first text data.

* * * * *